(12) United States Patent
Amabili et al.

(10) Patent No.: US 6,805,013 B2
(45) Date of Patent: Oct. 19, 2004

(54) CORIOLIS MASS FLOW METER HAVING A THIN-WALLED MEASURING TUBE

(75) Inventors: Marco Amabili, S. Benedetto del Tronto (IT); Rinaldo Garziera, Como (IT)

(73) Assignee: Krohne AG, Basel (CH)

( * ) Notice: Subject to any disclaimer, the term of this patent is extended or adjusted under 35 U.S.C. 154(b) by 87 days.

(21) Appl. No.: 09/979,820

(22) PCT Filed: May 31, 2001

(86) PCT No.: PCT/EP01/06188

§ 371 (c)(1),
(2), (4) Date: Oct. 28, 2002

(87) PCT Pub. No.: WO01/92833

PCT Pub. Date: Dec. 6, 2001

(65) Prior Publication Data

US 2003/0089180 A1 May 15, 2003

(30) Foreign Application Priority Data

Jun. 1, 2000 (IT) .................................. PR2000A0038

(51) Int. Cl.$^7$ ................................................ G01F 1/84
(52) U.S. Cl. ................................................... 73/861.357
(58) Field of Search ...................... 73/861.354–861.357

(56) References Cited

U.S. PATENT DOCUMENTS 5,448,921 A * 9/1995 Cage et al. ............ 73/861.357
5,837,885 A * 11/1998 Goodbread et al. ......... 73/32 A

* cited by examiner

Primary Examiner—Edward Lefkowitz
Assistant Examiner—Corey D. Mack
(74) Attorney, Agent, or Firm—Cesari and McKenna, LLP

(57) ABSTRACT

A mass flow meter operating by the Coriolis principle, with a measuring tube through which flows a medium, at least one exciter associated with and exciting the measuring tube, and at least one sensor associated with the measuring tube for capturing the Coriolis forces and/or the Coriolis-force-induced oscillations. The measuring tube is designed as a thin shell. A thin shell is understood to be characterized by a wall thickness h much smaller than its radius R, and a length L of the same order of magnitude of the radius R. The mass flow meter according to the invention uses vibration modes with more than one circumferential wave. Thus, a mass flow meter with high sensitivity and low pressure drop is achieved.

14 Claims, 4 Drawing Sheets

CORIOLIS MASS FLOW METER HAVING A THIN-WALLED MEASURING TUBE

BACKGROUND OF THE INVENTION

The invention concerns a mass flow meter operating by the Coriolis principle, with a measuring tube through which flows a medium, at least one exciter associated with and exciting the measuring tube, and at least one sensor associated with the measuring tube for capturing the Coriolis forces and/or the Coriolis-force-induced oscillations.

Generally, the existing Coriolis flow meters are based on vibrations of a to measuring tube of length L much larger than the radius R (L=20–100 R); this measuring tube has a mono-dimensional dynamic behaviour, as a beam or a string. In fact, the vibration mode used for the measurement comprises a movement of the axis of the measuring tube itself. Such Coriolis flow meters according to the prior art show a considerable pressure drop, wherein the pressure drop is proportional to the length of the measuring tube. However, Coriolis flow meters with shorter measuring tubes have the drawback of an increased stiffness and thus, a higher natural frequency making the excitation of the measuring tube more difficult and the measuring process itself less sensitive.

SUMMARY OF THE INVENTION

Accordingly, it is the object of the invention to provide a mass flow meter with high sensitivity and low pressure drop.

The mass flow meter according to the invention with which the above mentioned object is achieved is characterized in that the measuring tube is designed as a thin shell. A thin shell is understood to be characterized by a wall thickness h much smaller than its radius R, and a length L of the same order of magnitude of the radius R. Such a mass flow meter according to the invention will also be referred to as a vibrating shell flow meter in the following.

The vibrating shell flow meter uses vibration modes with more than one circumferential wave. These mode-shapes are described by a figure with lobes in a cross-section of the shell. The shell vibration is generally provided with one or more exciters and the vibration is measured by sensors placed at different axial locations. The phase difference or time shift between (or among) the signals coming from the sensors are proportional to the mass flow rate. The oscillation frequency of the shell is univocally related to the mass density of the flow and permits an independent measurement of the mass flow rate and mass density of the flow at the same time.

According to a preferred embodiment of the invention the wall thickness of the measuring tube is at least by a factor of 50 smaller than the radius of the measuring tube. Further, the wall thickness of the measuring tube is preferably equal to or less than 0.5 mm, most preferably equal to or less than 0.25 mm. The ratio of the length of the measuring tube relative to the radius of the measuring tube is preferably equal to or less than 6, most preferably equal to or less than 4.

According to a further preferred embodiment of the invention at least one lumped mass is provided on the thin shell. Sensor(s) or/and exciter(s) which are fixed to the thin shell can be used as such lumped masses. In order to achieve best results, however, it is preferred to use separate lumped masses, the mass of which exactly fits the requirements.

The vibrating shell flow meter with one or more added masses also uses vibration modes with more than one circumferential wave. However, these are significantly modified by the added lumped masses that are opportunely placed on the shell. These mode-shapes are described by a figure with lobes in a cross-section of the shell and present larger displacements at the locations of the lumped masses. The lumped masses added to the shell, where constituted by the sensor(s) or/and exciter(s), permit the frequency separation of the vibration modes of the shell in order to assure that the shell oscillation has exclusively the expected shape and permit a significant increment of the sensitivity of the meter.

According to a further preferred embodiment of the invention the exciter(s) is/are positioned on the anti-node(s) of the vibrating thin shell and operate radially in- and outwardly. Preferably at least two exciters are used wherein the exciters are fixed to the thin shell at the same axial length of the shell but spaced apart from each other by a predefined angle. Especially, it is preferred that the angle is 90° and the exciters are operated in phase or that the angle is 45° and the exciters are operated in opposition of phase.

Further, it can be convenient in some applications to insert an inner tube inside the measuring tube to make an annular flow. Preferably the inner tube is provided centrally in the measuring tube. With the use of an inner tube it is achieved that the effective cross section of the measuring tube is decreased which in turn increases the velocity of the flowing medium. Since the sensitivity of the meter is proportional to the velocity of the flowing medium the sensitivity is further increased.

BRIEF DESCRIPTION OF THE DRAWINGS

There are numerous ways in which the mass flow meter according to the invention can be configured and further enhanced. In this context, reference is made to the dependent claims and to the following description of preferred embodiments of the invention in conjunction with the drawings, in which:

FIG. 6b is a cross sectional view of the mass flow meter of FIG. 6a.

DESCRIPTION OF THE PREFERRED EMBODIMENT

Figure 1:
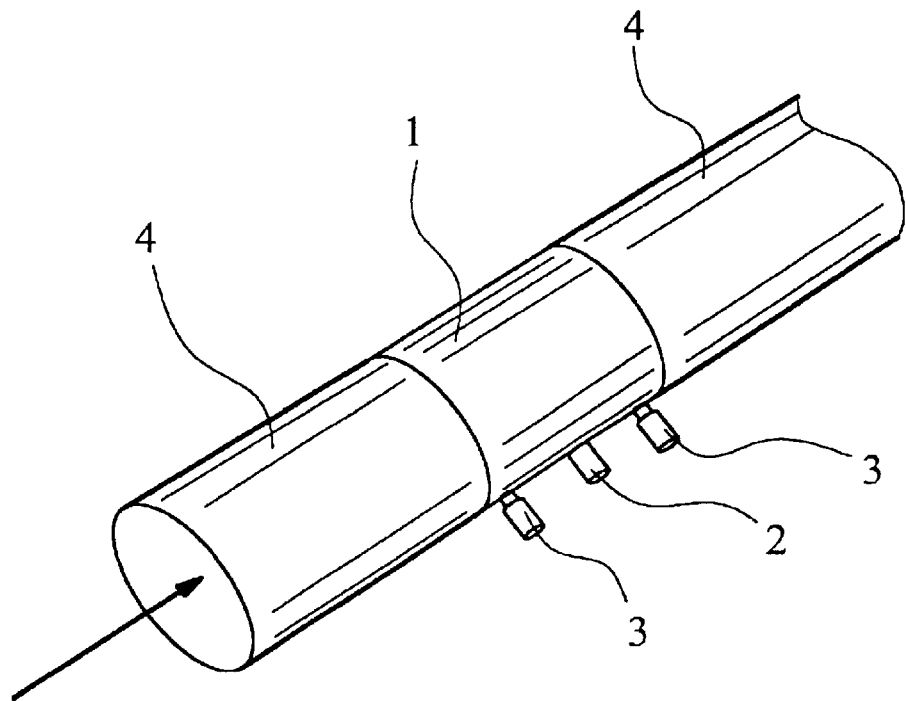
FIG. 1 is a schematic side view of a mass flow meter according to a preferred embodiment of the invention.

In FIG. 1 a mass flow meter according to a preferred embodiment of the invention is shown. The mass flow meter comprises a measuring tube 1, an exciter 2, and two sensors 3 fixed to the measuring tube 1. The measuring tube 1 is designed as a thin shell that is fixed to the main tube 4 by welding. In some applications, conical tube fittings can be used to connect the vibrating shell to the main tube 4. The thin shell of the meter shown in FIG. 1 is made of titanium and has a diameter of 25.4 mm, a wall thickness of 0.25 mm, and a length of 90 mm. Thus, the length of the thin shell is in the same order of magnitude as its diameter, and the ratio of the length of the thin shell relative to its diameter is less than 4.

Figure 2:
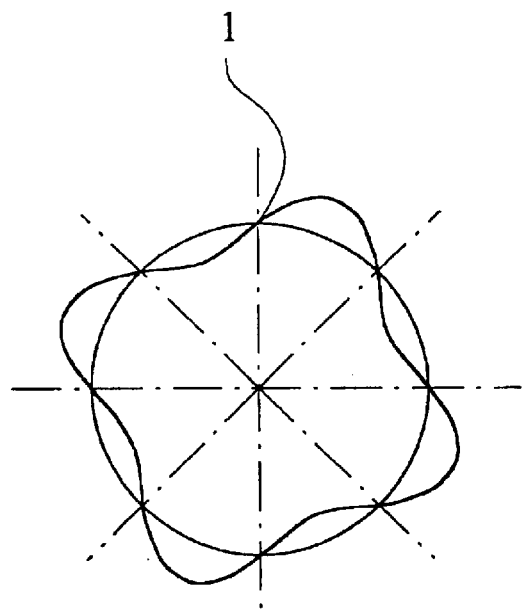
FIG. 2 is a cross sectional view of the vibrating shell.

The vibrating shell flow meter shown in FIG. 1 uses vibration modes of the shell with more than one circumferential wave; these mode-shapes are described by a figure with lobes in a cross-section of the shell, as shown in FIG. 2. Modes with more than one circumferential wave present no movement of the shell axis. These vibration modes are the lowest frequency modes for a shell that is not too long and can be used to make shorter meters with respect to existing Coriolis flow meters. The fact that the vibrating shell has a length of the same order of magnitude of the shell radius permits the application to measuring tubes 1 with large diameter, avoiding the problem of very long (and expensive) Coriolis flow meters based on measuring tube vibration. Keeping the same radius, the shorter is the length of the shell, the larger is the number of circumferential waves associated with the fundamental mode (which is the mode with the lowest natural frequency) of the shell. The sensitivity of the meter, i.e. the phase difference between signals measured by two vibration sensors 3 placed at different axial locations, increases with the number of circumferential waves.

The meter shown in FIG. 1 is composed by a circular cylindrical shell, which is connected to the measuring tube 1 containing the flow that has to be measured. It must be observed that the circular cylindrical shell can be substituted by shells with a non-circular cross-section or with a non-straight axis without changing the basic mechanical behaviour of the meter.

The shell can be driven in vibrations by one or more exciters 2, even if flow-induced vibrations of the shell due to the flow itself could be used in some meters. It seems that it is possible to have a better behaviour of the shell flow meter if the vibration of the fundamental mode (which is the mode with the lowest natural frequency) of the shell is driven into vibration. However, different modes with higher frequency can be driven into vibration, by changing the excitation frequency, without changing the basic mechanical behaviour of the meter.

It seems convenient that the measurement of the shell vibration is made by two sensors 3 placed on the same generating line (parallel to the axial flow) of the shell where is placed one of the exciters 2 (or the single exciter 2), at two different axial locations sufficiently distant from each other. A possible configuration is shown in FIG. 1, where the sensors 3 are placed at the same distance from the middle of the shell. It must be clarified that a different number of sensors 3 can be used to measure the shell vibration without changing the general working of the meter; similar results are obtained with different positions of the sensors 3; all these solutions must be considered as variants of the same meter. The sensors 3 can be accelerometers, capacitive proximity sensors, optical sensors (e.g. laser interferometers or triangulation telemeters) or any other type of sensor that is capable of measuring the local shell displacement, velocity or acceleration.

The vibrating shell flow meter according to the invention is based on the fact that vibration mode-shapes of a circular cylindrical shell (or a shell with a different form, as previously explained) are modified by an internal (or external) flow. For an axisymmetric shell without added masses, the fundamental mode has a symmetric shape with respect to a middle cross-section of the shell and it is a natural mode, that is all the points of the shell surface have in-phase oscillation. The presence of axial flow changes the shape of the fundamental mode, which loses the symmetry with respect to the middle of the shell and presents a phase difference among the oscillation of points with different axial position on the shell. This phase difference among points with different axial position gives a complex mode and is characteristic of gyroscopic systems. The phase difference or the time shift necessary to reach a certain configuration (for example the maximum amplitude of oscillation) at a fixed axial position can be used to measure the mass flow rate. Both phase difference and time shift increase practically linearly with the flow rate if the measurement is made for flow velocities far enough from the critical velocity of the shell.

The phase difference is computed between (or among) the signals coming from the sensors 3 that measure the shell vibration. The time shift is computed between (or among) the signals coming from the sensors 3, for example by using a cross-correlation between the signals. The measurement of the time shift is linear with the mass flow rate and is independent of the fluid mass density; therefore it is suitable to measure directly the mass flow rate.

The measurement of the mass density of the fluid can be made by using the vibrating shell. In fact, the natural frequencies of the shell are functions of the mass density of the still fluid; the fluid velocity, in the range of application of the present flow meter, practically does not change this frequency. Therefore the measurement is independent of the flow velocity. A linear relationship is obtained between the mass density and the reciprocal of the squared frequency of the mode excited. Therefore an independent measurement of the mass flow rate and mass density are obtained with the same vibrating shell.

The proper working of the vibrating shell meter is obtained when the vibration mode of the shell is exactly known. The exciters can be useful in order to obtain the vibration with the expected mode-shape. The exciters 2 (or the single exciter 2) can be controlled in frequency in order to drive the vibration of the expected mode for any mass density of the flowing fluid; in fact, different densities give different natural frequencies of the shell, as previously discussed.

Figure 4:
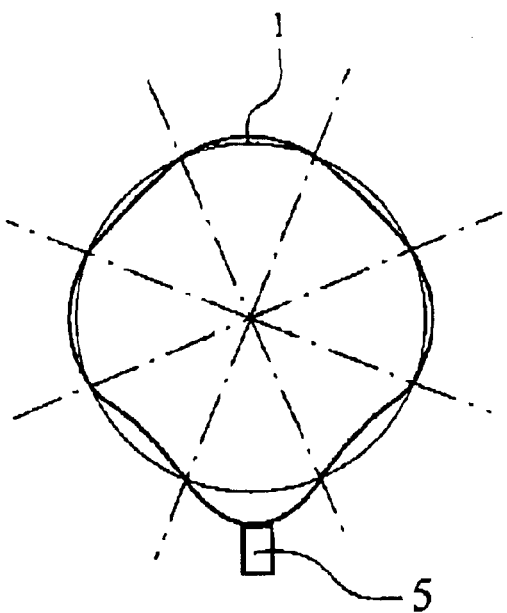
FIG. 4 is a cross sectional view of a thin shell with an added lumped mass.

In order to avoid that different modes, and not only the one expected, participate to the shell vibration it is important to have a sufficient frequency separation between the expected mode and the modes with closer natural frequency. A good frequency separation between the fundamental mode and the following modes is obtained with a good design of the shell. This operation is significantly improved by adding appropriate lumped masses 5 to the shell as can be seen from FIG. 4. In FIG. 4 a separate added lumped mass 5 is shown. However, these lumped masses 5 can also be given by the sensors 3 and exciters 2, if contact sensors 3 and exciters 2 are applied to the vibrating shell.

Figure 3:
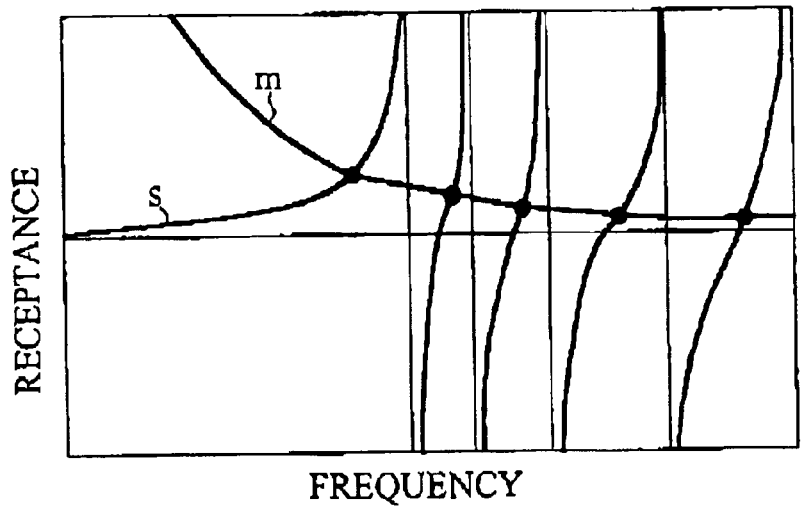
FIG. 3 is a graph showing the relationship between the receptance and the frequency for the shell and the lumped masses, respectively.

Favourable positions of these lumped masses 5 are on antinodes of the driving mode, in case on the same generating line of the shell where the sensors 3 are placed. The effect of an added lumped mass 5 is that of moving the natural frequencies of the shell to smaller values; this decrement of the natural frequency is much larger for the fundamental mode with respect to the following modes; this phenomenon can also be seen from FIG. 3, where the receptances (vibration amplitude/force) of the shell (s) and a lumped mass (m) are shown. The intersections between the receptances of the shell and the lumped mass 5 give the natural frequencies of the shell with added lumped mass 5; the original natural frequencies of the shell are the vertical asymptotes in the shell receptance.

Another advantage given by lumped masses 5 added to the vibrating shell is the possibility to have an increment of the sensitivity of the meter. For example, added masses on the same generating line (of a circular cylindrical shell) of the sensors 3 that measure the shell vibration can give a significant increment to the phase difference (i.e. to the sensitivity). Also the axial position of the lumped masses 5 is important. For example, lumped masses 5 placed in correspondence of the points where the shell vibration is measured can increase significantly the sensitivity of the meter.

As already stated above, in FIG. 4 a cross sectional view of a thin shell with a lumped mass 5 is shown. It can be seen that the vibration mechanics of a shell with added lumped masses 5 is very different with respect to the one of the shell without added masses (compare FIGS. 2 and 4). In fact, the mode-shapes of the shell are significantly modified by connection with lumped masses 5, so they become different with respect to mode-shapes of the shell without masses. Moreover, the symmetry is lost if only one or an odd number of lumped masses 5 is used.

Figure 5A:
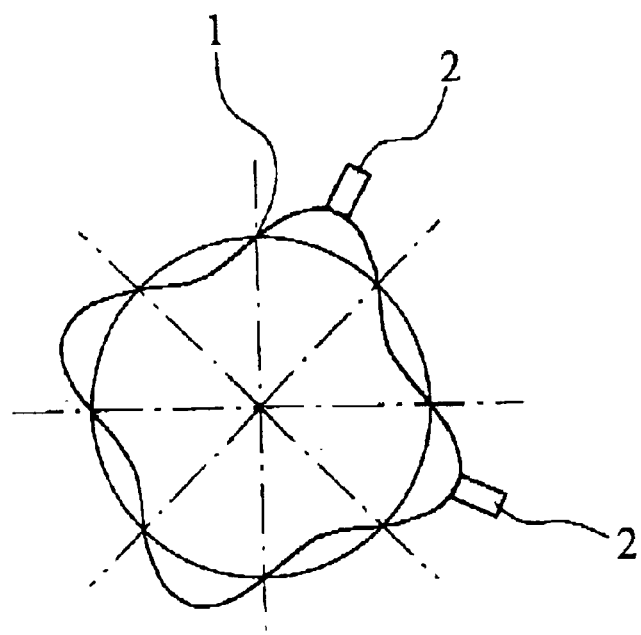
FIG. 5a is a cross sectional view of a thin shell with two exciters having an angle of 90° relative to each other.
Figure 5B:
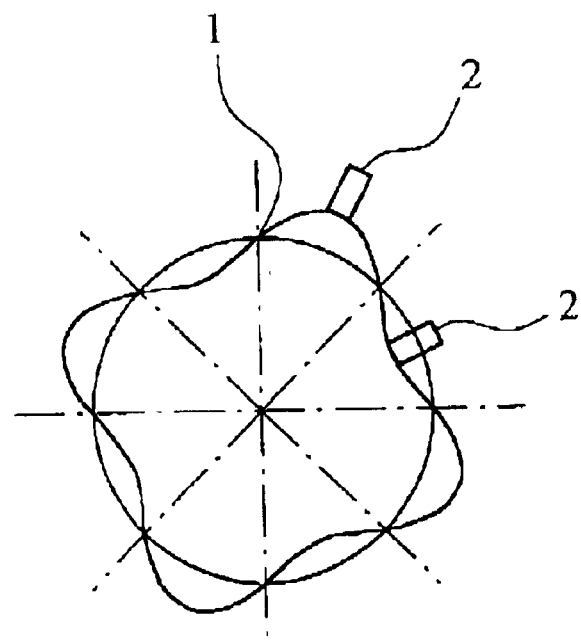
FIG. 5b is a cross sectional view of a thin shell with two exciters having an angle of 45° relative to each other.

FIGS. 5a and b show cross sectional views of a thin shell with two exciters 2 which are fixed to the shell at the same axial length but with a predefined angle relative to each other. In both cases the exciters 2 are fixed on antinodes of the driving mode. However, according to the embodiment shown in FIG. 5a, the exciters 2 are fixed to the thin shell with an angle of 90° relative to each other, and according to the embodiment shown in FIG. 5b the exciters 2 are fixed to the thin shell with an angle of 45° relative to each other. Thus, according to the first arrangement, the exciters 2 are operated in phase, wherein according to the second arrangement, the exciters 2 are operated in anti-phase.

Figure 6A:
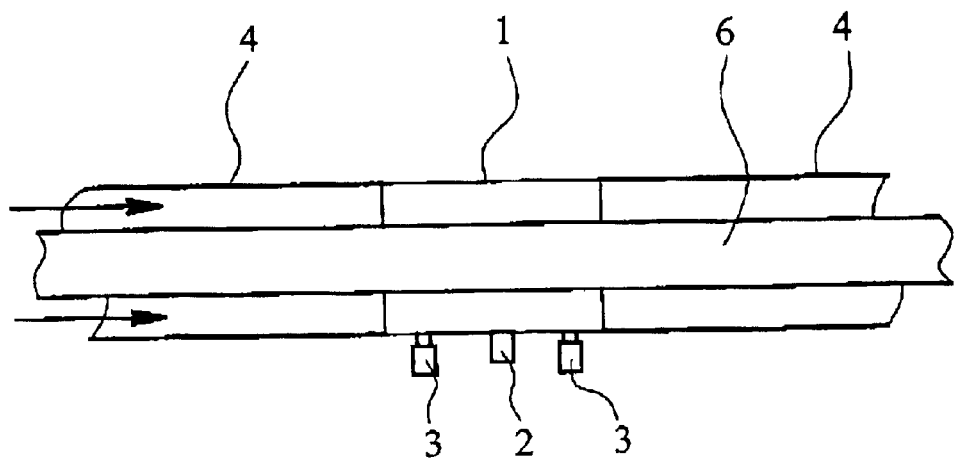
FIG. 6a is a longitudinal section of a mass flow meter with an inner tube inserted into the measuring tube.
Figure 6B:
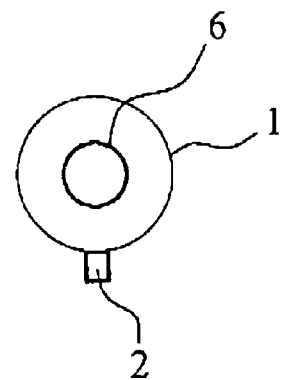

From FIGS. 6a and b a mass flow meter according to a preferred embodiment of the invention in a longitudinal and a cross sectional view, respectively, can be seen that comprises an inner tube 6 inserted into the measuring tube 1. Thus, the effective cross section for the flowing medium (indicated by arrows from the left) is decreased, increasing the sensitivity of the meter as explained further above.

The meters with vibrating shell, object of the present invention, can also be inserted in an annular or unbounded flow, and are not only suitable to contain an internal flow. The behaviour of the meter is substantially unchanged. In application with the meter immersed in the flow, the sensors and exciters will be placed at the opposite side of the shell skin with respect to the surface in contact with the flow.

What is claimed is:

1. A mass flow meter operating by the Coriolis principle with a measuring tube through which flows a medium, at least one exciter associated with and exciting the measuring tube, and at least one sensor associated with the measuring tube for capturing the Coriolis forces and/or the Coriolis-force-induced oscillations wherein the measuring tube is designed as a thin shell, and an inner tube is provided inside the measuring tube to make an annular flow.

2. The mass flow meter according to claim 1, wherein the measuring tube has a wall thickness which is much smaller than the radius of the measuring tube, and a length of the same order of magnitude as the radius.

3. The mass flow meter according to claim 1 or 2, wherein the wall thickness of the measuring tube is smaller than the radius of the measuring tube at least by a factor of 50.

4. The mass flow meter according to claim 1 or 2 wherein the wall thickness of the measuring tube is equal or less than 0.5 mm, preferably equal to or less than 0.25 mm.

5. The mass flow meter according to claim 1 or 2, wherein the ratio of the length of the measuring tube relative to the radius of the measuring tube is equal to or less than 6, preferably equal to or less than 4.

6. The mass flow meter according to claim 1 or 2 wherein the inner tube is provided centrally in the measuring tube.

7. A mass flow meter operating by the Coriolis principle, with a measuring tube through which flows a medium, at least one exciter associated with and exciting the measuring tube, and at least one sensor associated with the measuring tube for capturing the Coriolis forces and/or the Coriolis-force-induced oscillations wherein the measuring tube is designed as a thin shell, the measuring tube has a length of the same order of magnitude of the radius, and the wall thickness of the measuring tube is smaller than the radius of the measuring tube at least by a factor of 50.

8. The mass flow meter according to the claim 7, wherein the wall thickness of the measuring tube is equal or less than 0.5 mm, preferably equal to or less than 0.25 mm.

9. The mass flow meter according to claim 7 or 8, wherein the ration of the length of the measuring tube relative to the radius of the measuring tube is equal to or less than 6, preferably equal to or less than 4.

10. The mass flow meter according to claim 7 or 8, wherein at least one added lumped mass is placed on the measuring tube.

11. The mass flow meter according to claim 10 wherein the lumped mass is provided on an anti-node of the driving mode.

12. A mass flow meter operating by the Coriolis principle, with a measuring tube through which flows a medium, at least one exciter associated with and exciting the measuring tube, and at least one sensor associated with the measuring tube for capturing the Coriolis forces and/or the Coriolis-force-induced oscillations wherein the measuring tube is designed as a thin shell, the wall thickness of the measuring tube is smaller than the radius of the measuring tube at least by a factor of 50, the wall thickness of the measuring tube is equal to or less than the 0.5 mm, and the ratio of the length of the measuring tube relative to the radius of the measuring tube is equal to or less than 6.

13. The mass flow meter according to claim 12, wherein at least one added lumped mass is placed on the measuring tube.

14. The mass flow meter according to claim 13, wherein the lumped mass is provided on an anti-mode of the driving mode.

* * * * *